United States Patent [19]

Bartels

[11] Patent Number: 4,565,930

[45] Date of Patent: Jan. 21, 1986

[54] BOILER LOW WATER SENSING SYSTEM UTILIZING ENERGY TRANSFER NETWORK MEANS FOR DELAY

[75] Inventor: James I. Bartels, Hudson, Wis.

[73] Assignee: Honeywell, Inc., Minneapolis, Minn.

[21] Appl. No.: 616,101

[22] Filed: Jun. 1, 1984

[51] Int. Cl.<sup>4</sup> ...................... G08B 29/00; H01H 35/18
[52] U.S. Cl. .................................. 307/118; 340/620; 361/178; 73/304 R
[58] Field of Search ............... 307/118, 116; 361/178; 340/620, 618; 73/304 R; 137/392

[56] References Cited

U.S. PATENT DOCUMENTS

| | | | |
|---|---|---|---|
| 4,182,363 | 1/1980 | Fuller | 137/392 |
| 4,224,606 | 9/1980 | Bartles | 340/620 X |
| 4,356,406 | 10/1982 | Bartels | 307/118 |
| 4,360,738 | 11/1982 | Bartels | 307/118 |

Primary Examiner—Harry E. Moose, Jr.
Assistant Examiner—Todd E. DeBoer
Attorney, Agent, or Firm—Alfred N. Feldman

[57] ABSTRACT

An energy transfer network is used to ensure reliable operation of a low water sensing system for a boiler. The energy transfer network provides a sufficient time interval to make sure that wave action and boiling within the boiler do not simulate the loss of water. The energy transfer network is structured to be discharged in the event water actually drops below an appropriate level. The energy transfer network provides for the continuous presence of water so that boiling action does not simulate an artificially high (presence of) water level.

5 Claims, 1 Drawing Figure

BOILER LOW WATER SENSING SYSTEM UTILIZING ENERGY TRANSFER NETWORK MEANS FOR DELAY

BACKGROUND OF THE INVENTION

Many low water sensing systems utilize a probe that completes an electric circuit through the boiler water in order to sense the presence or absence of boiler water. A simple sensing circuit is impractical due to the foaming, boiling, and movement of the boiler water when a boiler is in use. A simple probe for sensing the establishment or interruption of an electric circuit has the practical defect of being unreliable, and can cause nuisance shut downs of the boiler operated system.

Attempts to overcome this problem have been made in the past by the use of fixed time delay mechanisms. Such a time delay system is shown in the J. I. Bartels U.S. Pat. No. 4,360,738, and assigned to the assignee of the present invention. This United States patent shows an attempt to solve this problem by the use of a fixed electronic type timer. This type of system may be utilized in some applications, but fixed time delays can create unsatisfactory operation in other applications. The turbulence within the boiler is therefore, an ongoing type of problem to the industry.

SUMMARY OF THE INVENTION

The present invention is directed to a low water sensing system for a boiler which utilizes a transfer of energy from the energizing means to a first capacitor. The energy is then transferred in a controlled manner in an energy transfer network to a further capacitor. The further capacitor operates through an amplifier and relay to control the overall system. The energy transfer network also includes a reset means to change the energy transfer characteristics, and to further allow for a resetting of the system upon the loss of water after the initial start up of the system.

In accordance with the present invention there is provided a low water sensing system for a boiler, including: energizing means having a bidirectional and periodic output of voltage; probe means adapted to make contact between water in a boiler and control circuit means; said control circuit means having input means connected between said probe means and said energizing means; said control circuit means further having output means responsive to the presence or absence of water in said boiler to in turn operate said output means for operation of said boiler; said input means including a pair of capacitors and a diode connected in series circuit to allow a current to flow to charge a first of said capacitors when water is present between said probe and said boiler with said diode blocking a reverse flow of current to said first capacitor; energy transfer network means having an input connected across said first capacitor and said network means having a third capacitor as an output; said third capacitor connected to said control circuit output means; and said energy transfer network means further including a resistor connecting said first capacitor and said third capacitor to controllably transfer energy from said first capacitor to said third capacitor to operate said control circuit output means upon the detection of water for a period of time.

Further in accordance with the present invention, there is also provided a low water sensing system for a boiler, including: energizing means having an output voltage; probe means adapted to make contact between water in a boiler and control circuit means; said control circuit means having input means connected between said probe means and said energizing means; said control circuit means further having output means responsive to the presence or absence of water in said boiler to in turn operate said output means for operation of said boiler; said input means including a pair of capacitors connected in series circuit to allow a current to flow to charge a first of said capacitors when water is present between said probe and said boiler; energy transfer network means having an input connected across said first capacitor and said network means having a third capacitor as an output; said third capacitor connected to said control circuit output means; and said energy transfer network means further including a resistor connecting said first capacitor and said third capacitor to controllably transfer energy from said first capacitor to said third capacitor to operate said control circuit output means upon the detection of water for a period of time.

BRIEF DESCRIPTION OF THE DRAWINGS

The single FIGURE shows a circuit schematic of the inventive system.

DESCRIPTION OF THE PREFERRED EMBODIMENTS

Figure 1:
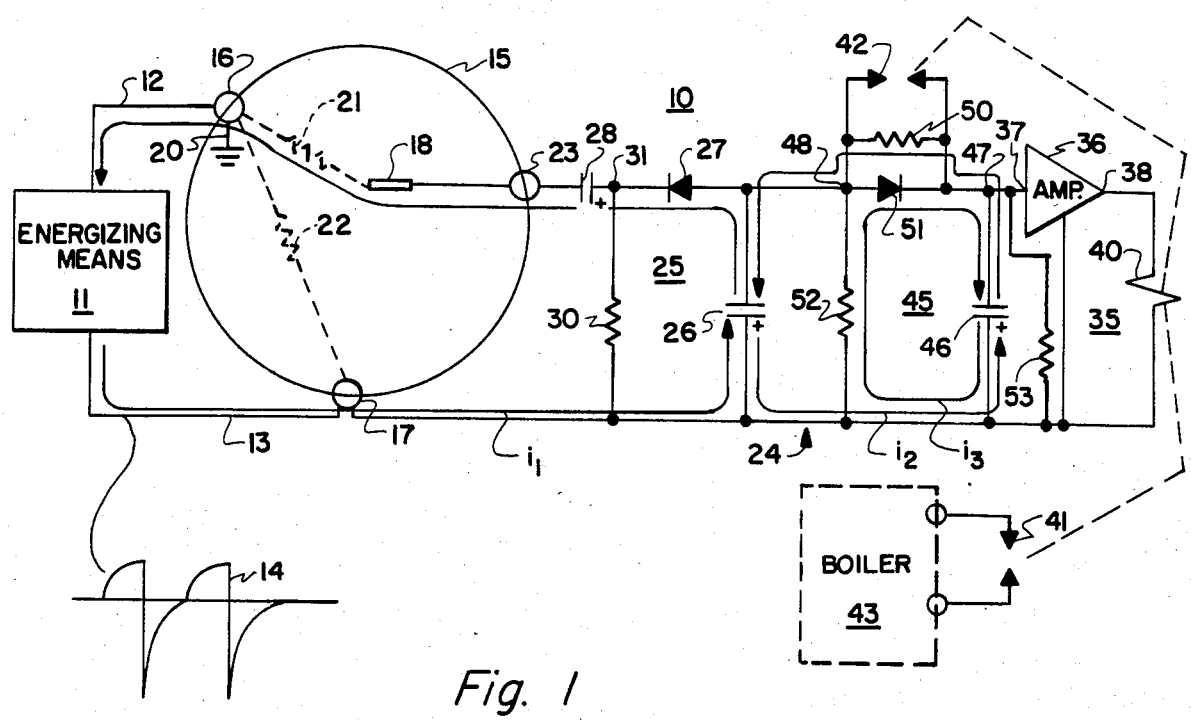

A low water sensing system for a boiler is generally disclosed at 10. An energizing means 11 is disclosed in block form and typically would be a source of energy having a bidirectional and periodic output of voltage at conductors 12 and 13. A wave form 14 is disclosed as being a typically type of output from means 11. The energizing means 11 could be of a type specifically disclosed in J. I. Bartels U.S. Pat. No. 4,356,406 and assigned to the assignee of the present invention. The energizing means 11 could be any other type of source of potential such as a conventional alternating current, or a square wave. The output at conductors 12 and 13 of the wave form of that disclosed at 14 has been found to be particularly useful in the operation of low water sensing systems, as this type of wave form keeps the associated equipment operating with a minimum of electrolysis and a maximum cleaning action.

A probe means is disclosed at 15 and could be of a type of probe as disclosed in the previously mentioned U.S. Pat. No. 4,356,406. The probe means has a boiler shell ground at 16, a guard ring 17, and a probe element 18. While a guard ring element 17 has been disclosed, the guard ring could be dispensed with and a two-element probe utilizing merely the boiler shell 16 and the probe element 18 could be used. The boiler shell 16 is grounded at 20 and acts as a general electrical ground for the system. The probe means 15 is exposed within the boiler shell of the boiler to which the present low water sensing system is installed, and is capable of sensing water as represented at 21 between the boiler shell 16 and the probe element 18. A further phantom resistance circuit 22 has been disclosed between ground and the guard ring 17. The resistance 22 occurs as a fault within the system and can be detected by a three element probe means 15 in a manner known in the art. It has been shown merely to clarify the type of installation involved in the present invention. The probe element 18 is connected at 23 to a third terminal for the probe means 15.

The low water sensing system 10 has a control circuit means generally disclosed at 24 that has an input means 25 made up of a first capacitor 26 connected in a series circuit with a diode 27 and a second capacitor 28 across the terminals 17 and 23. A sensitivity setting resistor 30 is connected between the terminal 17 and a node 31. The resistor 30 acts to set the sensitivity of the system in conjunction with the resistance 21 of water within the boiler. The control circuit input means 25 generally includes the capacitors 26 and 28 along with the diode 27 and the resistor 30.

The control circuit means 24 has a control circuit output means generally disclosed at 35. The output means includes a conventional amplifier 36 having an input 37 and an output 38. The output 38 is connected to a relay means 40 and to the terminal 17 which acts as a common conductor for the sensing means 10. The relay means 40 has a pair of normally open contact means 41 and 42 with the contact means 41 connected to a burner for a boiler 43 that is intended to heat the water contained in the boiler to which the probe means 15 is exposed. The normally open relay contact 42 forms part of the control circuit output means 35, and acts in a manner that will be described in connection with the overall operation of the circuit.

The circuit is completed by connecting the control circuit input means 25 to the control circuit output means 35 by an energy transfer network means disclosed at 45. The energy transfer network means 45 includes a third capacitor 46 that is connected at a node 47 to the input 37 of amplifier 36, and to the terminal 17 which is common to the system. A large resistor 53 is connected in parallel with capacitor 46. The energy transfer network means 45 includes a resistor 50 that is connected from the node 47 to a node 48. Connected in parallel with the resistor 50 is a diode 51. It is noted that the diode 51 and the resistor 50 are paralleled by the normally open contacts 42. The energy transfer network is completed by the addition of a resistor 52 connected between the terminal 17 and the node 48.

OPERATION

At the outset, it is assumed that the low water sensing system is being put into initial operation. Also, the energizing means 11 is assumed to have a voltage output at conductors 12 and 13 of a wave form such as 14. If water 21 is present between the probe element 18 and the boiler shell ground 20, the application of voltage from the energizing means 11 will cause a current $i_1$ to flow to immediately start charging the capacitor 26 through the diode 27 and the capacitor 28 through the water 21. The capacitor 26 takes on a charge indicated on the half cycle when the conductor 13 is positive with respect to the conductor 12. When the polarity of the energizing means 11 reverses, the diode 27 precludes any substantial conduction. Capacitor 28 discharges back into (through) the water during this half cycle. Total conduction is actually the same during each half cycle. The diode 27 causes a change in paths—not in total current. The capacitor 28 acts to block any direct current flow that would exist in a system of this type, and the resistor 30 is used in conjunction with the resistance of the water 21 to establish the sensitivity of the system. Typically, boiler water between a probe element 18 and a boiler shell ground 20 is in the order of 4000 ohms, and the resistor 30 is selected with the 4000 ohm reference to set a sensitivity for the low water sensing system 10.

A second current begins to flow at $i_2$ in the energy transfer network means 24 wherein energy is transferred from the capacitor 26 to the capacitor 46 through the resistor 50. The time constant of the circuit in which current $i_2$ flows is relatively long (approximately 20 seconds in an actual embodiment). As such, little current flows directly from the energizing means 11 to charge the capacitor 46. The primary charge on capacitor 46 is accomplished by transferring energy from the capacitor 26 to the capacitor 46 as shown at $i_2$. As soon as the voltage across the capacitor 46 reaches a sufficient level, (indicating that water has been present for a predetermined period of time) the amplifier 36 is operated to energize the relay 40. The operation of the relay 40 closes the relay contact 41 to energize the boiler in a heating mode. Simultaneously, the contacts 42 are closed thereby shorting out the resistor 50. This changes the characteristics of the energy transfer network means 24 so that energy is continued to be transferred from the capacitor 26 to the capacitor 46 to keep the capacitor 46 charged. This is the normal operating mode for the system as long as water 21 is sensed by the probe means 15.

If for some reason the water 21 disappears between the probe element 18 and the boiler shell 20, the current $i_1$ ceases to flow and the related current $i_2$ ceases to charge the capacitor 46. Also, at this time a third current $i_3$ begins to become a factor. A discharge or reset circuit made up of the resistor 52 and the diode 51 becomes effective to discharge the capacitor 46 after the relay contact 42 returns to an open circuit condition. Resistor 53 is very large and provides a small portion of the discharge path. The discharge circuit made up of the resistor 52 and the diode 51 acts to ensure that the capacitor 46 is sufficiently discharged so that at a start up cycle the low water sensing system 10 will function properly.

A very specific and detailed low water sensing system for a boiler has been disclosed that utilizes a unique type of energy transfer network to ensure that wave action or boiling within the boiler does not create intermittent action when sufficient water is actually present for proper operation. The time constants and configuration of the energy transfer network can be altered depending on the type of probe used and the type of energizing means utilized for the low water sensing system. As such, the applicant wishes to be limited in the scope of his invention solely the scope of the appended claims.

The embodiments of the invention in which an exclusive property or right is claimed are defined as follows:

1. A low water sensing system in a boiler, including: energizing means having a bidirectional and periodic output of voltage; probe means adapted to make contact between water in a boiler and control circuit means; said control circuit means having input means connected between said probe means and said energizing means; said control circuit means further having output means responsive to the presence or absence of water in said boiler to in turn operate said output means for operation of said boiler; said input means including a pair of capacitors and a diode connected in series circuit to allow a current to flow to charge a first of said capacitors when water is present between said probe and said boiler with said diode blocking a reverse flow of current to said first capacitor; energy transfer network means having an input connected across said first capacitor and said network means having a third capacitor as an output; said third capacitor connected to said control circuit output means; and said energy transfer network means further including a resistor connecting said first capacitor and said third capacitor to controllably transfer energy from said first capacitor to said third capacitor to operate said control circuit output means upon the detection of water for a variable period of time.

2. A low water sensing system for a boiler as described in claim 1 wherein said control circuit output means includes an amplifier and a relay having normally open contacts; said relay operated by said amplifier to close a first of said contacts to cause the heating of said boiler.

3. A low water sensing system for a boiler as described in claim 2 wherein said resistor of said energy transfer network means is connected in parallel circuit with a second of said relay contacts; said second of said relay contacts operated by said amplifier to short out said resistor of said energy transfer network means to allow direct transfer of energy from said first capacitor to said third capacitor.

4. A low water sensing system for a boiler as described in claim 3 wherein said energy transfer network means includes a further resistor in parallel circuit with said first capacitor; and a diode connecting said further resistor to said third capacitor to provide said third capacitor with a discharge path upon the loss of water in said boiler at said probe means.

5. A low water sensing system in a boiler, including: energizing means having an output voltage; probe means adapted to make contact between water in a boiler and control circuit means; said control circuit means having input means connected between said probe means and said energizing means; said control circuit means further having output means responsive to the presence or absence of water in said boiler to in turn operate said output means for operation of said boiler; said input means including a pair of capacitors connected in series circuit to allow a current to flow to charge a first of said capacitors when water is present between said probe and said boiler; energy transfer network means having an input connected across said first capacitor and said network means having a third capacitor as an output; said third capacitor connected to said control circuit output means; and said energy transfer network means further including a resistor connecting said first capacitor and said third capacitor to controllably transfer energy from said first capacitor to said third capacitor to operate said control circuit output means upon the detection of water for a variable period of time.

* * * * *